United States Patent Office 3,808,211
Patented Apr. 30, 1974

3,808,211
4-(SUBSTITUTED AMINO)-2-(5-NITRO-2-FURYL) PYRIMIDO[4,5-d]PYRIMIDINES
Louis Edmond Benjamin, Livingston, N.J., assignor to Morton-Norwich Products, Inc.
No Drawing. Filed June 12, 1972, Ser. No. 261,587
Int. Cl. C07d 51/46
U.S. Cl. 260—256.4 F         8 Claims

ABSTRACT OF THE DISCLOSURE 4-(substituted amino)-2-(5-nitro-2-furyl)pyrimido[4,5-d]pyrimidines are useful antibacterial agents.

---

This invention relates to 4-(substituted amino)-2-(5-nitro-2-furyl)pyrimido[4,5-d]pyrimidines. They are useful antibacterial agents. They can be prepared as described here below.

EXAMPLE I (A) Preparation of 5-cyano-4-(5-nitro-2-furamido) pyrimidine

Molten 5-nitrofuroyl chloride (880 g. 5 moles) was added at a moderate rate to a stirred mixture of 4-amino-5-cyanopyrimidine (600 g. 5 moles) and pyridine (3200 ml.). When the temperature reached 55° ice bath cooling was used. The mixture thickened and turned brown. Vigorous stirring was used while the remaining 5-nitrofuroyl chloride was added at 55–60°. When the addition was completed the ice bath was removed and stirring was continued for 0.5 hour. The dark mixture was cooled to room temperature and diluted with ice water (3200 ml.). The dark solid was collected by filtration and washed successively with water, isopropanol and ether. After partially drying by air, the dark gray solid was stirred at room temperature with dimethylformamide (1800 ml.) for 5 minutes, and again collected by filtration. The solid was washed with dimethylformamide (500 ml.) and then with ether. After drying by suction the solid was light gray and weighed 837 g. (64%); M.P. 282–284°.

*Analysis.*—Calcd. for $C_{10}H_5N_5O_4$ (percent): C, 46.34; H, 1.94; N, 27.02. Found (percent): C, 46.38, 46.39; H, 2,27, 2.27; N, 26.94, 26.78.

(B) Preparation of 5-carbamoyl-4-(5-nitro-2-furamido) pyrimidine

Powdered A. (268 g. 1.03 moles) was added with stirring to concentrated sulfuric acid (1070 ml.) in portions while keeping the temperature below 30° with intermittent cooling. Stirring was continued at room temperature for 2 hours after the addition was completed. The brown solution was poured over ice and the resulting mixture was diluted to 8 liters with water. The tan solid was collected by filtration, washed thoroughly with water, isopropanol and ether and dried at 110° to yield 248 g. (87%) of tan powder; M.P. ca. 330°.

(C) Preparation of 2-(5-nitro-2-furyl)pyrimido[4,5-d] pyrimidine-4-(3H)-one

A stirred mixture of 5-carbamoyl-4-(5-nitro-2-furamido) pyrimidine (200 g. 0.72 mole) and Dowtherm (1 l.) was boiled for 10 min. The dark mixture was cooled, diluted with methanol, and filtered to give a dark solid. The dark solid was washed with methanol and dried at 100° to yield 176 g. (92%); M.P. ca. 330°. Recrystallization of the product from dimethylformamide (20 ml./g. Darco) gave beige needles which were very sensitive to light. The infrared spectrum indicated a complex. The beige needles were heated in boiling methyl Cellosolve (10 mg./g.) for a few minutes, cooled and collected by filtration to give a tan powder; M.P. 334–335° (dec.).

*Analysis.*—Calcd. for $C_{10}H_5N_5O_4$ (percent): C, 46.34; H, 1.94; N, 27.02. Found (percent): C, 46.19, 46.13; H, 1.99, 1.84; N, 27.04, 26.96.

(D) Preparation of 4-chloro-2-(5-nitro-2-furyl)pyrimido [4,5-d]pyrimidine

A mixture of crude C. (318 g. 1.22 moles), phosphorus pentachloride (382.7 g. 1.84 moles) and thionyl chloride (1590 ml.) was heated at reflux with stirring for 15 hours. The mixture was cooled and filtered to give tan crystals (260 g. 77%); M.P. ca. 210° after washing with ether and drying at 100°.

(E) Preparation of 4-(2-hydroxyethyl(methyl)amino-2-(5-nitro-2-furyl)pyrimido[4,5-d]pyrimidine A suspension of 4-chloro-2-(5-nitro-2-furyl)pyrimido [4,5-d]pyrimidine (50 g. 0.18 mole) in methanol (500 ml.) was treated with N-methylethanolamine (27 g. 0.36 mole). The mixture was heated on a steam bath for 10 minutes and cooled to give a yellow powder. The powder was collected by filtration, washed successively with water, isopropanol and ether and dried at 110° to yield 52 g. (91%); M.P. ca. 200°. Recrystallization from nitromethane (30 ml./g. Darco) gave 37 g. M.P. 204–205° (corr.) with previous darkening.

*Analysis.*—Calcd. for $C_{13}H_{12}N_6O_4$ (percent): C, 49.37; H, 3.82; N, 26.57. Found (percent): C, 49.15, 49.30; H, 3.88, 3.90; N, 26.56, 26.38.

Other amines in lieu of N-methylethanolamine in like reaction with 4-chloro-2-(5-nitro-2-furyl)pyrimido[4,5-d] pyrimidine give the following:

| Ex. | Amine | Product | M.P., °C. |
|---|---|---|---|
| II | 2-hydroxyethyl hydrazine. | 4-[1-(2-hydroxyethyl)hydrazino]-2-(5-nitro-2-furyl)-pyrimido[4,5-d]pyrimidine. | 200–202 |
| III | 2-aminoethanol | 4-(2-hydroxyethyl)amino-2-(5-nitro-2-furyl)pyrimido-[4,5-d]pyrimidine. | 278–279 |
| IV | Methoxyethylamine | 4-(2-methoxyethyl)amino-2-(5-nitro-2-furyl)pyrimido-[4,5-d]pyrimidine. | 280–281 |
| V | Pyrrolidine | 4-(1-pyrrolidinyl)-2-(5-nitro-2-furyl)pyrimido[4,5-d]-pyrimidine. | 279–280 |
| VI | Isopropanolamine | 4-(2-hydroxypropyl)amino-2-(5-nitro-2-furyl)pyrimido-[4,5-d]pyrimidine. | 275–277 |
| VII | Diisopropanolamine | 4-bis(2-hydroxypropyl)amino-2-(5-nitro-2-furyl)-pyrimido[4,5-d]pyrimidine. | 215–216 |

The antibacterial potency of the compounds of this invention is illustrated in the table here below:

| Compound of example | Staph. aureus | D. pneumoniae | E. insidiosa | Strep. pyogenes | Strep. agalactiae | Strep. faecalis | E. coli | S. typhosa |
|---|---|---|---|---|---|---|---|---|
| I(E) | 6.25 | 1.5 | 0.38 | 3.1 | 6.25 | 12.5 | 0.75 | 3.1 |
| II | 1.5 | 0.38 | 0.19 | 0.75 | 3.1 | 1.5 | 0.75 | 3.1 |
| III | 25 | 3.1 | 0.38 | 3.1 | 6.25 | 25 | 3.1 | 25 |
| IV | 0.75 | 1.5 | 0.048 | 1.5 | 12.5 | 3.1 | 1.5 | 3.1 |
| V | 0.38 | 0.75 | 0.048 | 0.19 | 1.5 | 0.38 | 0.75 | 0.75 |
| VI | 12.5 | 3.1 | 0.38 | 3.1 | 25 | | 3.1 | 25 |
| VII | 6.25 | 3.1 | 0.75 | 6.25 | 50 | | 12.5 | 25 |

NOTE.—Minimal inhibitory concentration is the lowest concentration of compound that prevents visible growth after 24-hour incubation.

They are thus adapted to be combined in the form of dusts, suspensions, solutions, unguents, sprays and the like using commonly employed carriers and vehicles to provide compositions useful in combatting bacterial organisms.

What is claimed is:

1. A compound of the formula:

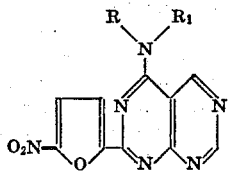

wherein R is hydrogen, methyl, amino, or 2-hydroxypropyl; $R_1$ is 2-hydroxyethyl, 2-methoxyethyl, or 2-hydroxypropyl; and R and $R_1$ taken together with N is pyrrolidinyl.

2. The compound of claim 1 wherein R is methyl and $R_1$ is 2-hydroxyethyl.

3. The compound of claim 1 wherein R is amino and $R_1$ is 2-hydroxyethyl.

4. The compound of claim 1 wherein R is hydrogen and $R_1$ is 2-hydroxyethyl.

5. The compound of claim 1 wherein R is hydrogen and $R_1$ is 2-methoxyethyl.

6. The compound of claim 1 wherein R is hydrogen and $R_1$ is 2-hydroxypropyl.

7. The compound of claim 1 wherein R is 2-hydroxypropyl and $R_1$ is 2-hydroxypropyl.

8. The compound of claim 1 wherein

is pyrrolidinyl.

References Cited
UNITED STATES PATENTS
2,949,466  8/1960  Hoefle et al. _____ 260—256.4

ALEX MAZEL, Primary Examiner
R. V. RUSH, Assistant Examiner

U.S. Cl. X.R.
260—999